UNITED STATES PATENT OFFICE.

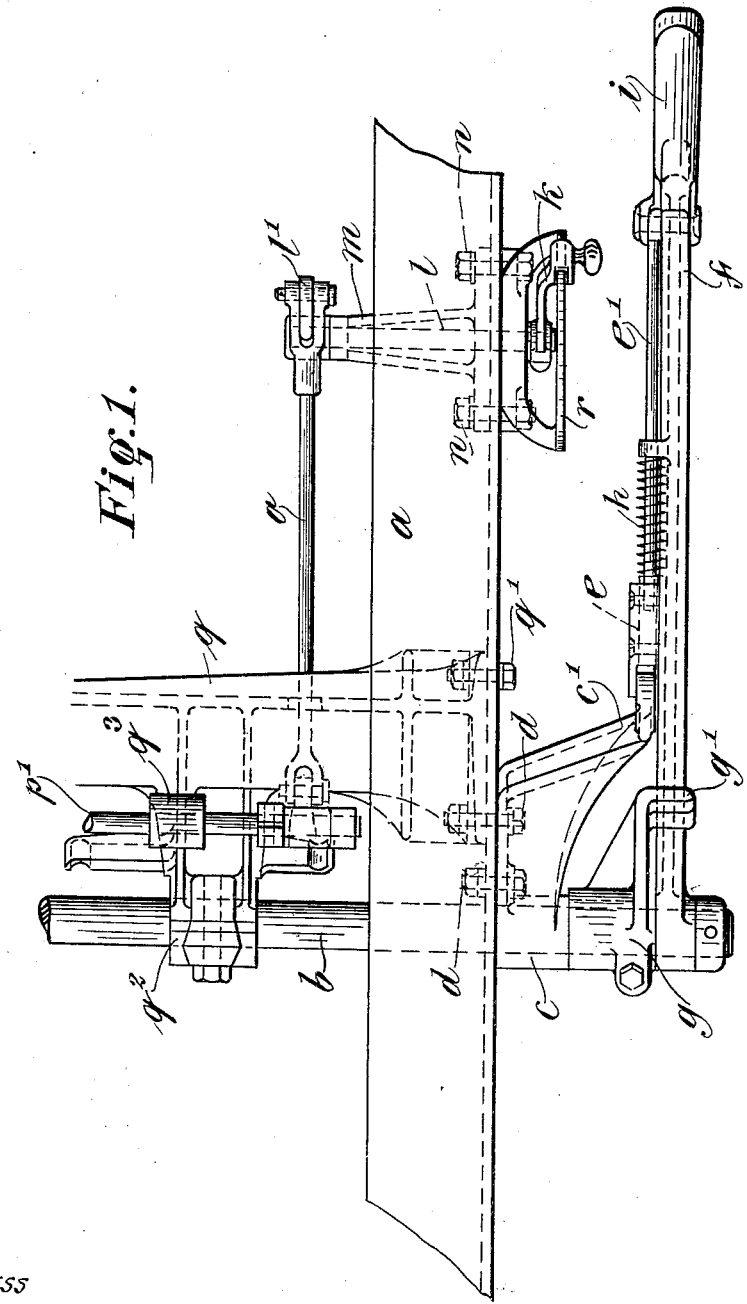

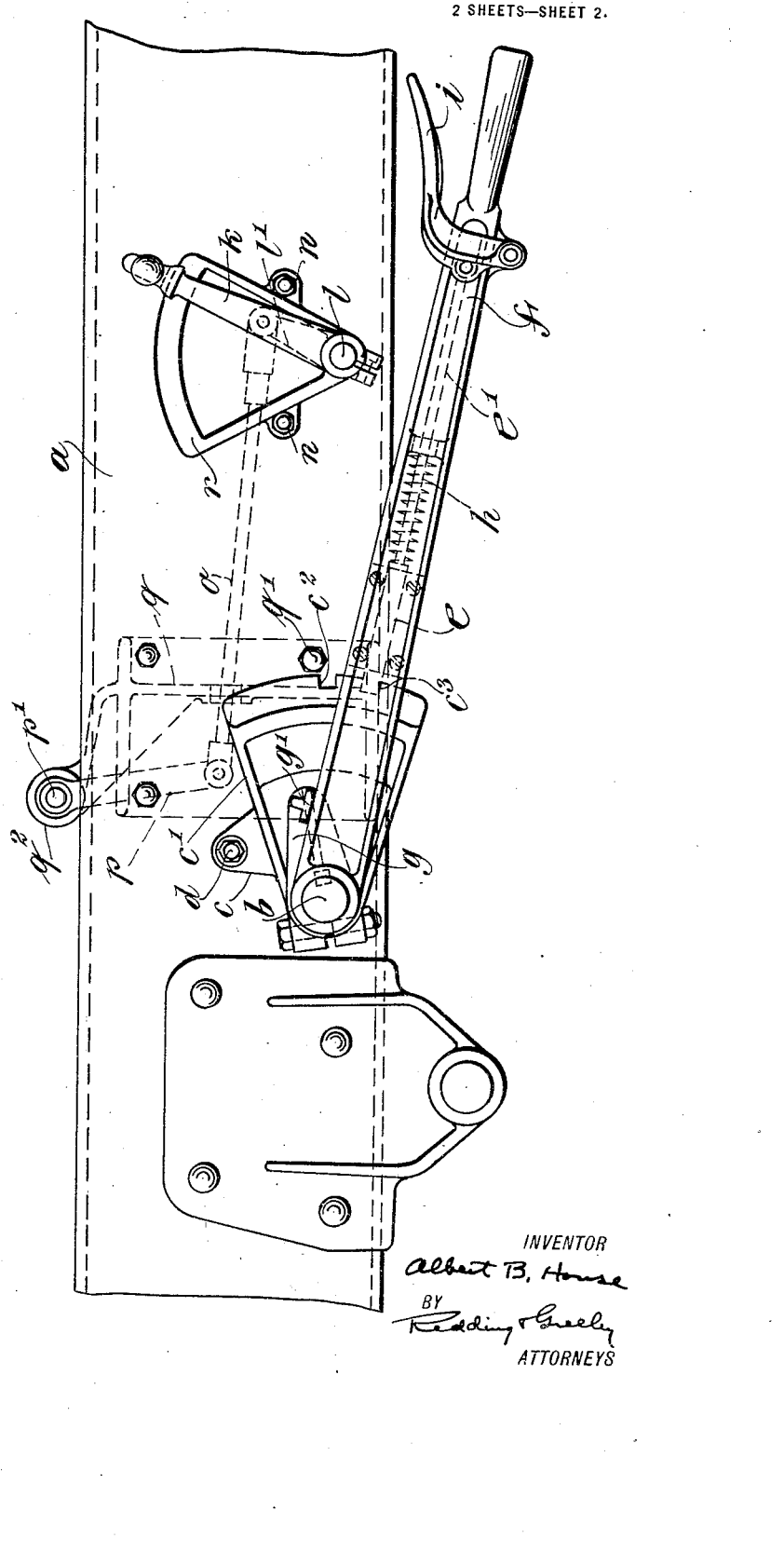

ALBERT B. HOUSE, OF BROOKLYN, NEW YORK, ASSIGNOR TO INTERNATIONAL MOTOR COMPANY, OF NEW YORK, N. Y., A CORPORATION OF DELAWARE.

MOTOR FIRE-ENGINE.

1,362,102.  Specification of Letters Patent.  Patented Dec. 14, 1920.

Application filed July 8, 1919. Serial No. 309,486.

*To all whom it may concern:*

Be it known that I, ALBERT B. HOUSE, a citizen of the United States, residing in the borough of Brooklyn of the city of New York, in the State of New York, have invented certain new and useful Improvements in Motor Fire-Engines, of which the following is a specification, reference being had to the accompanying drawing, forming a part hereof.

This invention relates to motor fire engines and is concerned particularly with the provision of devices for permitting the control of the speed of the propelling motor and the throwing of the clutch, from the side of the vehicle. In known constructions the speed of the propelling motor is regulated by the ordinary throttle control from the seat of the operator and the gears for connecting and disconnecting the fire pump from the drive shaft are actuated from the usual shifting lever after the clutch has been disengaged through the usual clutch pedal situated adjacent the floor board of the body. The improved devices are so connected with the actuating rock shaft for the clutch as to permit the operator to throw the clutch from the street level when standing at the side of the vehicle. Further, a throttle control readily accessible from the same position is provided.

The invention will be described at greater length in connection with the accompanying drawing in which—

Figure 1 is a fragmentary view in plan of so much of the frame of a motor fire engine as is necessary for an understanding of the application of the improved devices thereto.

Fig. 2 is a view in side elevation of the parts shown in Fig. 1.

One of the side frame members $a$ of the truck has journaled therein a rock shaft $b$ of the clutch by means of which the fire pump may be disconnected from the drive shaft in a manner commonly employed. This rock shaft $b$ extends through the side frame member $a$ and may be supported in a bearing $c$ secured to the side frame member by means of bolts $d$, this bearing $c$ carrying or having formed integral therewith a segment $c'$ with which coöperates a locking bolt $e$ slidably mounted in a hand lever $f$ loosely carried adjacent the end of the rock shaft $b$. On the rock shaft $b$ is secured an arm $g$ having a flange $g'$ which engages one edge of the hand lever $f$ under the pressure of the clutch spring as will be observed. The locking bolt $e$ for the hand lever $f$ is adapted to be engaged with one of two notches $c^2$, $c^3$, formed in the segment $c'$, under the influence of a spring $h$ which operatively engages the bolt $e$. This bolt $e$ may be retracted from its position of engagement with either of the notches $c^2$, $c^3$, by means of a hand grip $i$ pivoted adjacent the end of the lever $f$ and connected with the bolt by means of a link $e'$.

When the clutch is engaged its spring exerts a pressure on the rock shaft $b$ in a clockwise direction and through the fixed arm $g$ on the shaft tends to force the hand lever $f$ downward as viewed in Fig. 2 until the bolt $e$ engages the lower notch $c^3$. This is the normal position of the hand lever when the fire pump is in use or when the vehicle is being propelled and the fire pump is out of use. Actuation of the rock shaft $b$, as by means of the usual foot pedal for shifting of the vehicle transmission gears will not be interfered with when the hand lever $f$ is in the position shown in Fig. 2, since the arm $g$ is free to move in a counter-clockwise direction with relation to the hand lever. When the fire pump is in use and the operator desires to release the clutch for any purpose, as for engagement of the driving gears for the fire pump with the drive shaft, the bolt $e$ may be disengaged from the clutch $c^3$ by actuation of the tripping lever $i$ and the hand lever $f$ be thrown upward until the bolt $e$ engages the notch $c^2$. Such movement of the hand lever $f$ will rock the rock shaft $b$ in a counter-clockwise direction through engagement of the hand lever $f$ with the flange $g'$ on the arm $g$. If, at this time, the usual gear shifting lever is to be actuated, it will be understood that it can readily be reached by the operator from the street level standing at the side of the truck.

In order to permit control of the speed of the propelling motor by the operator at the side of the truck there is provided a throttle lever $k$ alongside of the side frame member $a$ and secured to a rock shaft $l$ which may extend through the side frame member and be journaled in a supporting bracket $m$ secured to the inner face of the side frame member as by means of bolts $n$. The rock shaft $l$ is connected operatively to the throttle control as by means of a link $o$ pivoted at one end to an arm $l'$ on the end of the shaft $l$ and at the other end to an arm $p$ fixed to an actuating shaft $p'$ which may be connected to the carbureter in any suitable manner. Extending transversely across the truck frame may be a beam $q$, one end of which may be secured to the inner wall of the side frame member $a$ as by means of one of the bolts $d$ and a second bolt $q'$. This transverse beam may carry a second bearing $q^2$ for the rock shaft $b$ and a bearing in which is journaled the throttle actuating shaft $p'$. The throttle lever $k$ may move over a segment $r$ secured to the outer face of the side frame member $a$ in a manner commonly practised.

From the description given it will be evident that when the improved motor fire engine has its pump in use the engagement and disengagement of the fire pump with the drive shaft can be readily effected by an operator standing at the street level at the side of the car and when the pump is once in use its speed may always be controlled from the same position by proper manipulation of the throttle lever $k$. These operations are effected by devices which are simple and which entail no material alteration either structurally or functionally of the usual corresponding vehicle control elements and in no wise interfere with the usual operation of the last named elements from the driver's seat.

I claim as my invention:

1. In a motor fire engine, an actuating rock shaft for the vehicle clutch extending to the side of the fire engine, an operating lever mounted loosely thereon and means connecting the rock shaft with the lever loosely to permit actuation of the rock shaft by the lever when the latter is moved in one direction and free movement of the rock shaft in the same direction.

2. In a motor fire engine, an actuating rock shaft for the clutch extending to the side of the fire engine, an operating lever mounted loosely thereon, means connecting the rock shaft with the lever loosely to permit actuation of the rock shaft by the lever when the latter is moved in one direction and free movement of the rock shaft in the same direction and coöperating devices carried by the lever and the fire engine for locking the lever releasably in predetermined position.

3. In a motor fire engine, in combination with the side frame members of the chassis, an actuating rock shaft for the clutch extending through one of the side frame members, bearings for the rock shaft carried on the last named side frame member, a lever mounted loosely on the end of the rock shaft, an arm secured to the rock shaft and having its end in operative relation to the lever, a locking segment mounted on the side frame member and locking devices carried by the lever and coöperating with the locking segment to lock the lever releasably in predetermined position.

4. In a motor fire engine, in combination with the side frame members of the chassis, a throttle actuating member, a rock shaft extending through one of the side frame members, a bracket in which the rock shaft is journaled secured on the inner face of the last named side frame member, a lever on the end of the rock shaft, a segment with which the lever is frictionally engaged and operative connections between the rock shaft and the throttle actuating member.

This specification signed this 30th day of June, A. D. 1919.

ALBERT B. HOUSE.